UNITED STATES PATENT OFFICE 2,684,935

DISTILLATION OF HYDROCARBON MIXTURES

Otto Redlich, Berkeley, and Charles M. Gable, El Cerrito, Calif., assignors to Shell Development Company, Emeryville, Calif., a corporation of Delaware No Drawing. Application June 24, 1952,
Serial No. 295,342

6 Claims. (Cl. 202—42)

This invention relates to a process of distillation to separate components of hydrocarbon mixtures. It relates more particularly to the separation by distillation in the presence of an extraneous agent of mixtures of isomeric aromatic hydrocarbons.

The art of separating various mixtures of organic compounds by distillation in the presence of an extraneous volatile substance which selectively changes the ratios of volatility of various components of the mixture is well known and extensive. The basis for the separation by azeotropic distillation and by extractive distillation is the shift of the vapor pressure equilibrium caused by the extraneous agent, wherein the partial vapor pressure of at least one component of the mixture is changed sufficiently to permit its separation by controlled fractional distillation. In the separation of hydrocarbons of different degrees of saturation, that is having different ratios of carbon to hydrogen atoms, by azeotropic distillation or by extractive distillation, there has usually been effected the separation of the relatively more saturated hydrocarbon as distillate product, together with azeotroping agent, leaving as undistilled bottoms relatively more unsaturated hydrocarbons, such as aromatics, which may or may not contain a portion of the extraneous substance in the case of azeotropic distillation, and which does contain selective solvent extraneous agent in the case of extractive distillation.

Although the art is replete with information on azeotropic and extractive distillation processes for separating components of various mixtures of organic compounds, still there are available commercial mixtures of compounds of similar boiling points which are difficult to separate effectively into their components. This is particularly true of mixtures of isomeric aromatic hydrocarbons.

It is a principal object of the present invention to provide an improvement in the art of distillation for the separation of mixtures of hydrocarbons. A specific object of the invention is to provide an improved process for the separation of mixtures of isomeric aromatic hydrocarbons by azeotropic distillation. Another specific object is to provide an improved extractive distillation process for the separation of isomeric aromatic hydrocarbons. These objects will be more fully understood and others will become apparent from the detailed description of the invention.

It has now been found that perfluorocarboxylic acids are effective agents for the separation of various mixtures of vaporizable hydrocarbons by distillation in the presence of the perfluoro acid. Whereas perfluorocarbons are known to exhibit solvent selectivity for the the more saturated (paraffinic) hydrocarbons, the replacement of all the hydrogen atoms in a carboxylic acid by fluorine atoms gives an enhancement in the solvent selectivity for the hydrocarbons which exhibit a more aromatic or a less saturated character. The perfluorocarboxylic acids are effective agents for the distillation separation of mixtures of hydrocarbons having different degrees of saturation, such as the separation of naphthenes from paraffins, aromatics from naphthenes, aromatics from paraffins. Furthermore, they are effective agents for the distillation separation of mixtures of closely boiling aromatic hydrocarbons, even isomeric aromatic hydrocarbons, particularly mixtures of isomeric alkyl-aryl hydrocarbons having alkyl groups of different sizes.

The relative proportions of azeotroping agent and of hydrocarbon which are vaporized and removed as an overhead stream or product in an azeotropic distillation for the separation of hydrocarbon mixtures is dependent on the relative volatility of acid to hydrocarbon. The lower the relative volatility of the agent, the lower is the relative proportion of such substance which is vaporized as compared with the other vaporized substance. It will be readily understood by those familiar with the subject matter to which this invention pertains that the particular perfluorocarboxylic acid which will be selected for a particular separation by azeotropic distillation will depend in large measure on the boiling points of the components of the mixture to be separated. Also, consideration must be given to mutual solubility relationships between the azeotroping agent and the hydrocarbon mixture as well as the component or components thereof which it is desired to be separated in the distillate. The azeotroping agent should be substantially soluble in the hydrocarbon mixture in the proportions required to be used for the particular separation at the temperature of the distillation. Recovery of the azeotroping agent is more readily effected when the mutual solubilities of azeotroping agent and distillate hydrocarbon are not too great at ambient atmospheric temperature or the temperature of the usual cooling water available for condenser service. On the other hand, other methods can be utilized for recovery of the perfluoro acid from the hydrocarbons, such as by extracting the hydrocarbon with a suitable solvent, for instance pentane, or extracting the acid with a suitable solvent, such as water.

In the usual practice of the azeotropic distillation process of this invention, the overhead distillate may be cooled and condensed whereby the condensate separates into two liquid layers, the azeotroping agent predominating in the lower layer, which layer is returned as reflux to the azeotropic distillation zone, and an upper layer predominating in the hydrocarbon. The azeotroping agent in the upper layer is readily recovered by a redistillation in a separate distillation zone whereby all of the agent is removed as an overhead azeotropic composition, which is recycled to the first azeotropic distillation zone, and a bottoms fraction free from the agent.

In accordance with a preferred embodiment of the invention, the azeotropic distillation is carried out in the presence of water, the mixture of perfluoro acid and water requiring a smaller proportion of acid to give the same separating effect (alpha value), or, for the same proportion of acid (based on the hydrocarbon mixture), a greater separating effect being obtained. A further advantage in the use of a mixture of acid and water in the distillation zone is that the resulting presence of water in the overhead condensate enhances the separation of the acid and hydrocarbons into two separate phases, thereby simplifying the recovery of the perfluoro acid. Still other advantages include the reduction of corrosion and an increased stability of the acid.

From the foregoing considerations and the results of experimental determinations, in general the perfluorocarboxylic acid should be selected for a good separation by azeotropic distillation so that its boiling point is within the temperature range of from about 35° C. below to about 35° C. above the 50% boiling point of the mixture to be separated, preferably being not more than about 25° C. above or below. Thus, for the separation of ethyl benzene from xylenes in a mixture thereof (B. P. about 137° C.), perfluorobutyric acid (B. P. 122° C.) has been found to be an effective azeotroping agent. In the case of the lower boiling mixture, cyclohexane and benzene (B. P. 80° C.), trifluoroacetic acid (B. P. 72° C.) has been found to be particularly effective.

As will be understood, the azeotroping agent will be utilized in proportions sufficient to form an azeotropic composition with a substantial proportion of the hydrocarbon component which it is desired to separate as distillate, and in general will be within the range of from about ten times to about one third of the weight of the hydrocarbon component which is to be separated as distillate. Also, in order to secure the most effective separation by the process, the distillation usually will be carried out in a plural-stage fractional distillation zone, as in a column provided with suitable trays, packing, or the like. When water is also utilized in the azeotropic distillation, it will be from about 0.5% up to about saturation in the hydrocarbon-acid mixture at the temperature of distillation, usually being from about 5% to about 20% by weight of the acid.

As will be understood, when a perfluoro acid is to be used as extraneous agent in an extractive distillation, the agent will be selected so that its volatility is substantially lower than that of the mixture to be separated (B. P. preferably 35° C. higher) so that it functions essentially as a liquid phase selective solvent at the temperature of the distillation of the hydrocarbon mixture. For instance, perfluorobutyric acid is a suitable extractive distillation agent for the extractive distillation separation of a mixture of cyclohexane and benzene, with benzene being selectively separated in the distillation bottoms fraction. The benzene is readily separated from the separated extract phase by distillation and the solvent recycled to the extractive distillation zone.

By proper selection of the perfluoro acid, a portion of it can be removed in the distillate fraction and a portion in the bottoms or extract fraction, for instance the use of perfluoropropionic acid in the separation of cyclohexane-benzene mixtures or of ethyl benzene-xylenes mixtures.

In order to provide quantitative data for the very difficult separation of ethyl benzene from para-xylene, boiling points of 136.19° C. and 138.35° C., respectively, an approximately equimolal mixture of ethyl benzene and p-xylene was distilled in a single stage equilibrium still with perfluorobutyric acid. The distillate split at room temperature in two phases with a separation factor $\beta=1.11$ for ethyl benzene/p-xylene. The overall relative volatility distillate/bottoms for these components was $\alpha=1.19$, compared with $\alpha_0=1.06$ for straight distillation. The detailed results are shown in Table I. Similar determinations gave an alpha value of 1.22 for ethyl benzene/m-xylene ($\alpha_0=1.08$).

TABLE I

*Azeotropic distillation of ethyl benzene-para-xylene with perfluorobutyric acid*

| | Ethyl benzene, percent wt. | p-Xylene, percent wt. | Acid, percent wt. |
|---|---|---|---|
| Composition: | | | |
| Feed | 9.35 | 8.98 | 81.2 |
| Distillate— | | | |
| upper layer | 40.4 | 33.1 | 24.0 |
| lower layer | 8.05 | 7.37 | 84.0 |
| Bottoms | 7.13 | 7.58 | 84.5 |
| Recovery: | | | |
| Distillate— | | | |
| upper layer | 14.7 | 12.1 | 1.0 |
| lower layer | 38.6 | 35.8 | 47.0 |
| Bottoms | 37.1 | 39.7 | 51.0 |

Azeotropic temperatures and compositions of the binary systems of perfluorobutyric acid with ethyl benzene, p-xylene and m-xylene are given in Table II.

TABLE II

*Azeotropes with perfluorobutyric acid*

| Hydrocarbon | Azeotropic Temp., ° C. at 760 mm. | Perfluorobutyric acid, percent wt. |
|---|---|---|
| Ethyl benzene | 115.4 | 79.9 |
| p-Xylene | 117.6 | 82.2 |
| m-Xylene | 117.5 | 83.2 |

The solubilities and critical solution temperatures of perfluorobutyric acid and ethyl benzene, p-xylene and m-xylene are given in Table III.

TABLE III

*Solubilities and critical solution temperatures*

| Hydrocarbon | ml. Hydrocarbon in 100 ml. Perfluorobutyric Acid at 25° C. | ml. Acid in 100 ml. Hydrocarbon at 25° C. | Critical Solution Temperature, ° C. |
|---|---|---|---|
| Ethyl benzene | 22 | 8 | 47.5 |
| p-Xylene | 36 | 12 | 32.5 |
| m-Xylene | 36 | 14 | 32.5 |

The data in Table IV demonstrate the advantages to be gained by carrying out the azeotropic distillation in the presence of a mixture of the perfluoro acid and water. Thus, comparison of the data in the first two columns shows that for the mixture of ethyl benzene-metal-xylene, for the same total solvent to hydrocarbon ratio (5.5) the same separation factor is obtained when about 20% water (based on the acid) is present, as compared with the anhydrous acid. Similarly, with a solvent containing about 13% water and a slightly higher solvent ratio, the relative volatility was increased from 1.22 to 1.30.

TABLE IV

*Azeotropic distillation of ethyl benzene-metaxylene with a mixture of perfluorobutyric acid and water*

| Test | A | B | C |
|---|---|---|---|
| Percent wt. acid | 84.5 | 70.6 | 75.9 |
| Percent wt. water | 0.0 | 14.0 | 11.7 |
| Acid/Hydrocarbon (weight ratio) | 5.5 | 4.6 | 6.1 |
| Total Solvent/Hydrocarbon (weight ratio) | 5.5 | 5.5 | 7.1 |
| Relative Volatility (Ethyl benzene/m-Xylene) | 1.22 | 1.21 | 1.30 |

Data for the azeotropic distillation of an approximately equimolal mixture of benzene and cyclohexane in the presence of trifluoroacetic acid are given in Table V.

TABLE V

*Azeotropic distillation of cyclohexane-benzene with trifluoroacetic acid*

| | Cyclohexane, percent wt. | Benzene, percent wt. | Acid, percent wt. |
|---|---|---|---|
| Composition: | | | |
| Feed | 8.5 | 9.6 | 8.2 |
| Overhead | 14.16 | 9.64 | 76.1 |
| Bottoms | 6.79 | 8.71 | 84.5 |
| Recovery (Percent of Feed): | | | |
| Overhead | 75.5 | 45.5 | 42.1 |
| Bottoms | 38.3 | 43.5 | 49.8 |

Relative Volatility (cyclohexane/benzene) = 1.89.

The perfluorocarboxylic acids are suitable also for the separation of higher benzene derivatives, for instance, of mesitylene from methyl ethyl benzenes, or of cymene from butyl benzenes. In these separations the perfluorocarboxylic acids present the same special advantage as in the separation of m-xylene and ethyl benzene. In other hydrocarbon separations, such as the separation of aromatics and naphthenes, the perfluoro acids are comparable with other good azeotroping and extractive distillation agents.

We claim as our invention:

1. A process for the separation of a mixture of isomeric aromatic hydrocarbons having alkyl groups of different size by distilling the mixture in the presence of a substantial proportion of a perfluorocarboxylic acid having a boiling point within about 25° C. of the 50% boiling point of the mixture and separating an overhead distillate portion which is enriched in one of the isomeric hydrocarbons and a bottoms portion which is enriched in at least another one of the isomeric aromatic hydrocarbons.

2. A process for the separation of a mixture of isomeric aromatic hydrocarbons having alkyl groups of different size by distilling the mixture in the presence of a substantial proportion of a perfluorocarboxylic acid having a boiling point within about 25° C. of the 50% boiling point of the mixture and of from about 5% to about 20% by weight of water, based on the amount of perfluorocarboxylic acid, and separating an overhead distillate portion which is enriched in one of the isomeric hydrocarbons and a bottoms portion which is enriched in at least another one of the isomeric aromatic hydrocarbons.

3. A process for the separation of ethyl benzene from para-xylene in a mixture containing them by distilling the mixture in the presence of a substantial proportion of perfluorobutyric acid and separating an overhead distillate portion which is enriched in ethyl benzene and a bottoms portion which is enriched in para-xylene.

4. A process for the separation of ethyl benzene from a mixture of $C_8$-aromatic hydrocarbons containing ethyl benzene and at least one xylene by distilling the mixture in the presence of a substantial proportion of perfluorobutyric acid and separating an overhead distillate portion which is enriched in ethyl benzene and a bottoms portion which is enriched in at least one xylene.

5. A process for the separation of ethyl benzene from a mixture of $C_8$-aromatic hydrocarbons containing ethyl benzene and at least one xylene by distilling the mixture in the presence of a substantial proportion of a perfluorocarboxylic acid having a boiling point within about 25° C. of the normal 50% boiling point of the mixture and separating an overhead distillate portion which is enriched in ethyl benzene and a bottoms portion which is enriched in at least one xylene.

6. A process for the separation of ethyl benzene from a mixture of $C_8$-aromatic hydrocarbons containing ethyl benzene and at least one xylene by distilling the mixture in the presence of a substantial proportion of perfluorobutyric acid and from about 5% to about 20% by weight of water, based on the amount of perfluorobutyric acid, and separating an overhead distillate portion which is enriched in ethyl benzene and a bottoms portion which is enriched in at least one xylene.

References Cited in the file of this patent

UNITED STATES PATENTS

| Number | Name | Date |
|---|---|---|
| 2,279,194 | Field | Apr. 7, 1942 |
| 2,356,240 | Hamlin | Aug. 22, 1944 |
| 2,562,068 | Souders | July 24, 1951 |
| 2,614,965 | Ruehlen | Oct. 21, 1952 |

OTHER REFERENCES

Journal of Research of the National Bureau of Standards, vol. 27, No. 1, pages 39–64 (July 1941). Article by Mair et al. (pages 44, 49 and 56 only needed).